(12) United States Patent
Wong et al.

(10) Patent No.: US 8,351,742 B2
(45) Date of Patent: Jan. 8, 2013

(54) SYSTEMS AND METHODS FOR SENSING PROPERTIES OF A WORKPIECE AND EMBEDDING A PHOTONIC SENSOR IN METAL

(75) Inventors: Chee Wei Wong, New York, NY (US);
Rohit Chatterjee, Chennai (IN);
Xiaochun Li, Madison, WI (US);
Xugang Zhang, Madison, WI (US)

(73) Assignee: The Trustees of Columbia University in the City of New York, New York, NY (US)

( * ) Notice: Subject to any disclaimer, the term of this patent is extended or adjusted under 35 U.S.C. 154(b) by 53 days.

(21) Appl. No.: 12/905,974

(22) Filed: Oct. 15, 2010

(65) Prior Publication Data
US 2011/0176763 A1    Jul. 21, 2011

Related U.S. Application Data

(62) Division of application No. 12/160,043, filed as application No. PCT/US2007/000133 on Jan. 3, 2007, now Pat. No. 7,840,101.

(60) Provisional application No. 60/755,799, filed on Jan. 3, 2006.

(51) Int. Cl.
*G02B 6/00* (2006.01)
*B05D 3/10* (2006.01)
(52) U.S. Cl. ............... 385/12; 385/13; 216/2; 216/24
(58) Field of Classification Search .............. 385/12, 385/13; 216/2, 24
See application file for complete search history.

(56) References Cited

U.S. PATENT DOCUMENTS

| | | | | |
|---|---|---|---|---|
| 5,283,852 A * | 2/1994 | Gibler et al. | ............... | 385/136 |
| 5,424,834 A | 6/1995 | Akedo et al. | | |
| 6,009,115 A | 12/1999 | Ho | | |
| 6,665,476 B2 * | 12/2003 | Braun et al. | ............... | 385/50 |
| 6,944,360 B2 * | 9/2005 | Li et al. | ............... | 385/12 |
| 6,961,499 B2 | 11/2005 | Lee et al. | | |

(Continued)

OTHER PUBLICATIONS

Karle, TJ. et al. "Observation of Pulse Compression in Photonic Crystal Coupled Cavity Waveguides". Journal of Lightwave Technology, vol. 22, No. 2, Feb. 2004. pp. 514-519.

(Continued)

*Primary Examiner* — Daniel Petkovsek
(74) *Attorney, Agent, or Firm* — Lisa A. Chiarini; Walter M. Egbert, III; Hughes Hubbard & Reed LLP

(57) ABSTRACT

Systems and methods for sensing properties of a workpiece and embedding a photonic sensor in metal are disclosed herein. In some embodiments, systems for sensing properties of a workpiece include an optical input, a photonic device, an optical detector, and a digital processing device. The optical input provides an optical signal at an output of the optical input. The photonic device is coupled to the workpiece and to the output of the optical input. The photonic device generates an output signal in response to the optical signal, wherein at least one of an intensity of the output signal and a wavelength of the output signal depends on at least one of thermal characteristics and mechanical characteristics of the workpiece. The optical detector receives the output signal from the photonic device and is configured to generate a corresponding electronic signal. The digital processing device is coupled to the optical detector and determines at least one of the thermal characteristics and mechanical the characteristics of the workpiece based on the electronic signal.

18 Claims, 8 Drawing Sheets

U.S. PATENT DOCUMENTS

| | | |
|---|---|---|
| 7,228,016 B2 | 6/2007 | Beausoleil |
| 7,260,279 B2 | 8/2007 | Gunn et al. |
| 7,492,979 B2 | 2/2009 | Wang et al. |
| 7,572,665 B2 * | 8/2009 | Datta et al. ............... 438/64 |
| 2001/0043629 A1 | 11/2001 | Sun et al. |
| 2006/0067605 A1 | 3/2006 | Mirkarimi et al. |

OTHER PUBLICATIONS

International Search Report and Written Opinion issued for corresponding International Patent Application No. PCT/US2007/000133, Mar. 12, 2008.

* cited by examiner

Figure 7
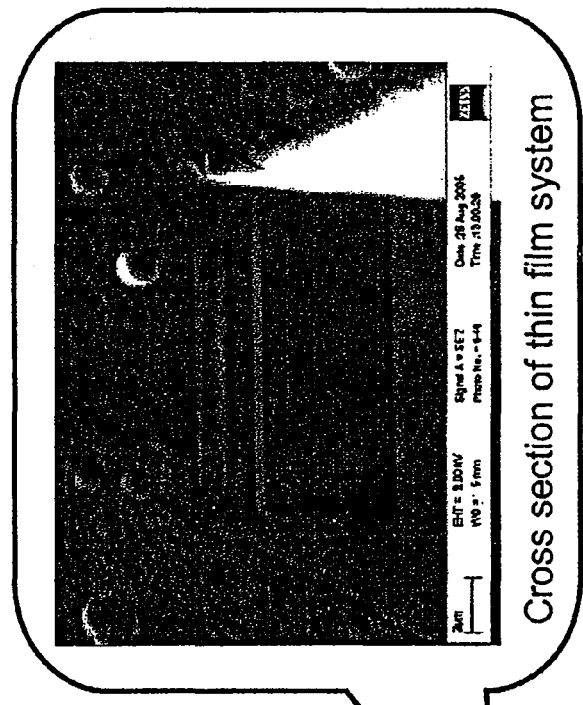
Cross section of thin film system
Thin film patterns were transferred to metal substrate
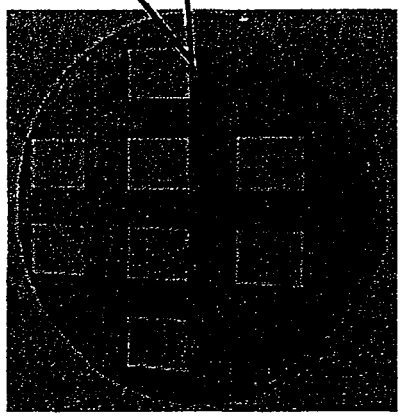
Thin film structures were embedded into metals

SYSTEMS AND METHODS FOR SENSING PROPERTIES OF A WORKPIECE AND EMBEDDING A PHOTONIC SENSOR IN METAL

CROSS-REFERENCE TO RELATED APPLICATIONS

This application is a divisional application of, and thus claims priority from, U.S. application Ser. No. 12/160,043 filed on Jan. 23, 2009, now U.S. Pat. No. 7,840,101, which is a U.S. national phase application under 35 U.S.C. §371 of International Patent Application No. PCT/US2007/000133, filed Jan. 3, 2007 and entitled "Systems and Methods for Sensing Properties of a Workpiece and Embedding a Photonic Sensor in Metal," which claims priority to U.S. Provisional Patent Application No. 60/755,799, filed Jan. 3, 2006 and entitled "Distributed Subwavelength Micro- and Nano-photonics for Ultrahigh Spatial- and Temporal-Resolution in Displacement, Strain, Vibrational, and Thermal Sensing," the entire contents of each of which are incorporated herein by reference.

STATEMENT OF GOVERNMENT INTEREST

The present subject matter was developed with Government support under grant number 0528900 awarded by the National Science Foundation. The Government may have certain rights in the present subject matter.

TECHNOLOGICAL FIELD

The disclosed subject matter relates to systems and methods for sensing properties of a workpiece and embedding a photonic sensor in metal.

BACKGROUND

Placing temperature and strain sensors directly into a manufacturing environment can help to obtain effective monitoring and control of manufacturing processes for computer chip and mechanical products. If critical conditions in these processes are continuously monitored with sensors, problems can be detected and solved during the processing cycle, resulting in improved product quality and productivity. There are ongoing efforts to fabricate electrically based micro-sensors, such as thin film thermocouples and strain gauges, for in-situ manufacturing process monitoring. Typically, however, with electrically based sensor arrays having a large number of sensors, e.g., that are distributed across a computer chip or mechanical product, the assembly of wires that allow readouts from these arrays can be cumbersome and costly. Monitoring the fabrication of metal structures in hostile manufacturing environments is particularly challenging because the presence of high temperatures, corrosive agents such as acids, alkalis, and oxidizers, and electromagnetic interference can damage an electrical sensor or impair its ability to monitor processes.

SUMMARY

Systems and methods for sensing properties of a workpiece and embedding a photonic sensor in metal are disclosed herein.

In some embodiments, systems for sensing properties of a workpiece include an optical input, a photonic device, an optical detector, and a digital processing device. The optical input provides an optical signal at an output of the optical input. The photonic device is coupled to the workpiece and to the output of the optical input. The photonic device generates an output signal in response to the optical signal, wherein at least one of an intensity of the output signal and a wavelength of the output signal depends on at least one of thermal characteristics and mechanical characteristics of the workpiece. The optical detector receives the output signal from the photonic device and is configured to generate a corresponding electronic signal. The digital processing device is coupled to the optical detector and determines at least one of the thermal characteristics and mechanical the characteristics of the workpiece based on the electronic signal.

Some embodiments include one or more of the following features. The digital processing device also modifies a parameter in a process being applied to the workpiece in response to the at least one of the thermal characteristics and the mechanical characteristics of the workpiece determined by the digital processing device. The photonic device includes a microring resonator. The photonic device includes a defect in a photonic crystal. The workpiece is one of a computer chip and a mechanical product. The photonic device is embedded in a layer of the workpiece. The photonic device has a Q between approximately 100 and approximately $10^5$. The photonic device has a Q between approximately 2,000 and approximately 20,000. The optical input includes a laser. The optical detector includes a photodiode. The optical input is coupled to the photonic device by a waveguide.

In some embodiments, methods of embedding photonic sensors in a metal include: depositing a first optically insulating layer on a substrate; depositing and patterning a waveguide material on the first optically insulating layer to define the photonic sensor; depositing and patterning a second optically insulating layer over the photonic sensor; depositing a first metal layer over the second optically insulating layer; etching the substrate to free the first and second optically insulating layers, the photonic sensor, and the first metal layer from the substrate and thus expose a surface of the first optically insulating layer; depositing a second metal layer over the exposed surface of the first optically insulating layer and thus substantially embed the photonic sensor and first and second optically insulating layers between the first and second metal layers.

In some embodiments, patterning the waveguide material includes at least one of lithography and etching.

In some embodiments, methods for sensing properties of a workpiece with a photonic device include: providing an optical signal to the photonic device; coupling the photonic device to a workpiece for which a measurement is desired, the photonic device generating an output signal in response to the optical signal, wherein at least one of an intensity of the output signal and a wavelength of the output signal depends on at least one of thermal characteristics and mechanical characteristics of the workpiece; receiving the output signal from the photonic device, and based on the output signal determining at least one of the thermal characteristics and the mechanical characteristics of the workpiece.

Some embodiments include one or more of the following features. Modifying a parameter in a process being applied to the workpiece in response to the at least one of the thermal characteristics and the mechanical characteristics of the workpiece determined. Coupling the photonic device to the workpiece includes embedding the photonic device in a layer of the workpiece.

In some embodiments, systems for sensing properties of at least two regions of a workpiece with at least two distributed photonic devices include an optical input, at least two distributed photonic devices, an optical detector, and a digital processing device. The optical input outputs an optical signal. The at least two distributed photonic devices are coupled to the at least two regions of the workpiece and to the optical input. The at least two distributed photonic devices generate at least two output signals in response to the optical input, wherein at least one of an intensity and a wavelength of each of the at least two output signals depends on at least one of thermal characteristics and mechanical characteristics of the at least two regions of the workpiece. The optical detector receives the at least two output signals from the at least two distributed photonic devices and is configured to generate a corresponding electronic signal. The digital processing device is coupled to the detector and determines at least one of the thermal characteristics and the mechanical characteristics of the at least two regions of the workpiece based on the electronic signal.

Some embodiments include one or more of the following features. An optical waveguide that couples the optical input to the at least two distributed photonic devices. An optical waveguide that couples the at least two distributed photonic devices to the optical detector. The at least two distributed photonic devices are embedded in one or more layers of the workpiece. At least one of the photonic devices includes a microring resonator. At least one of the photonic devices includes a defect in a photonic crystal.

In some embodiments, systems for sensing properties of a workpiece include: means for outputting an optical signal; means, coupled to the workpiece and to the optical signal, for generating an output signal in response to the optical signal, wherein at least one of an intensity of the output signal and a wavelength of the output signal depends on at least one of thermal characteristics and mechanical characteristics of the workpiece; means for detecting the output signal; and means for determining at least one of the thermal characteristics and the mechanical characteristics of the workpiece based on the detected output signal.

In some embodiments, the means for generating an output signal includes one of a microring resonator and a defect in a photonic crystal.

BRIEF DESCRIPTION OF THE DRAWINGS

FIG. 7 shows images of the transfer of a batch of photonic sensors to a substrate and the embedding of the sensors in metal according to some embodiments of the disclosed subject matter.

DETAILED DESCRIPTION

Figure 1:
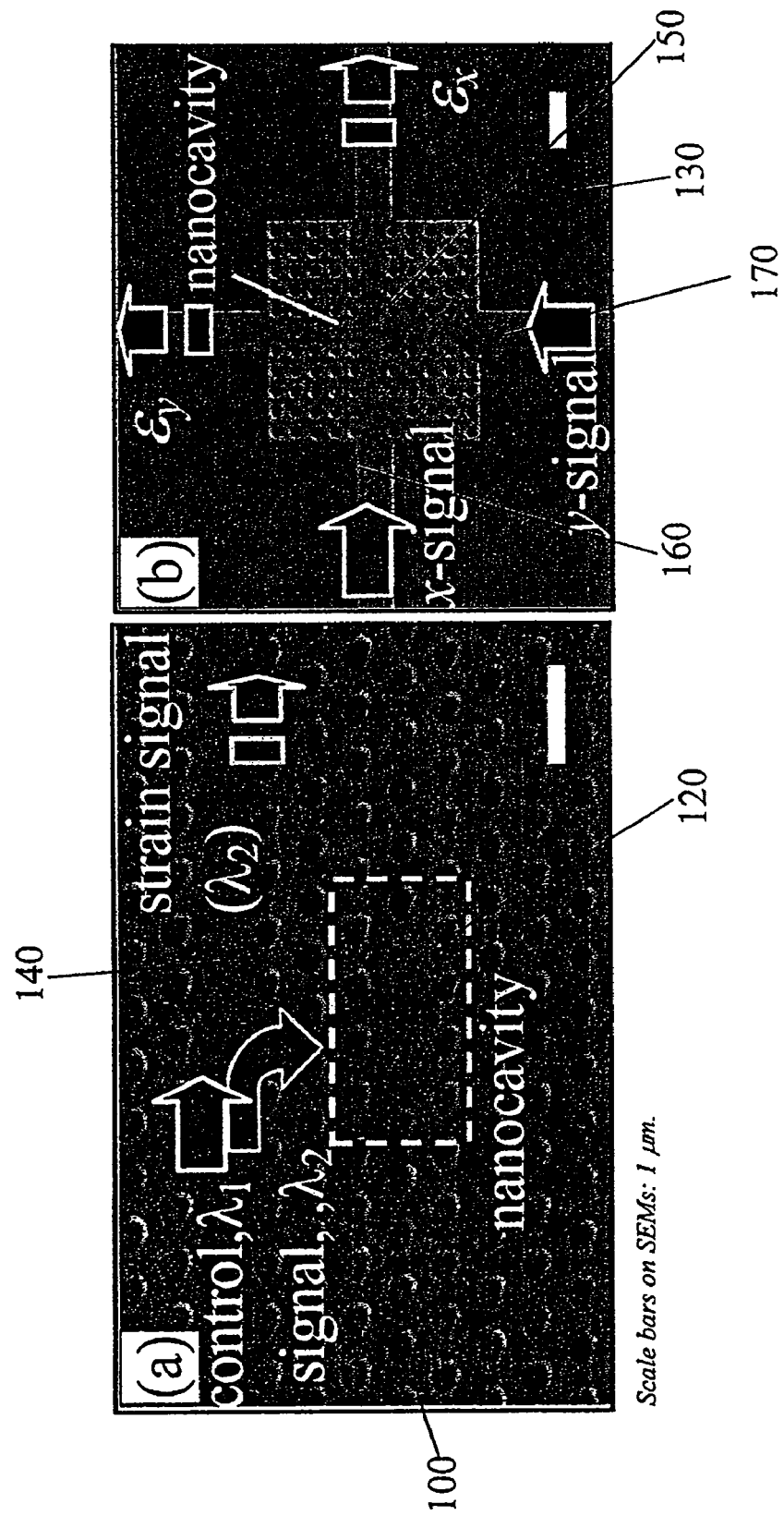
FIG. 1(a) is a micrograph of a nanocavity according to some embodiments of the disclosed subject matter.
FIG. 1(b) is a micrograph of a nanophotonic crystal sensor according to some embodiments of the disclosed subject matter.

Systems and methods for sensing properties of a workpiece and embedding a photonic sensor in metal are disclosed. In some embodiments, photonic devices, such as microring and nanophotonic crystal resonators, are useful for monitoring and controlling manufacturing processes for pieces such as computer chips and mechanical products, by monitoring the effects of thermo-mechanical phenomena arising from the manufacturing processes on the pieces. More specifically, in some embodiments and as described in greater detail below, the photonic sensors can be incorporated into and distributed throughout the pieces during an early manufacturing stage, e.g., before the pieces are exposed to processes that would benefit from being monitored. The sensors can be made sufficiently small, and can be selectively placed, such that they generally will not interfere with normal operation of the finished piece. In some embodiments, for example, the nanophotonic crystal-based nanocavities described below, the sensors can be less than about 1 micron in size, e.g., between about 100 nm and 1 micron in size, i.e., sub-micron, while in other embodiments, for example the microring resonators described below, the sensors can be between about 1 micron and about 10 microns in size, although other sizes are possible. Along with the sensors, optical waveguides can also be incorporated into and distributed throughout the pieces. These waveguides can allow an optical input of known wavelength distribution, from an optical source such as a laser, to be introduced to the sensors. The waveguides can also allow a corresponding optical output that relates to the thermo-mechanical effects of a process on the pieces to be collected from the sensors by a detector. Based on the intensity and/or wavelength distribution of the optical output, a computer processor in communication with the detector can then appropriately modify the manufacturing process so as to adjust the effects of the process on the pieces, for example, so as to inhibit damage to the pieces or otherwise improve the process.

The photonic sensors can provide multiple features that are difficult to obtain with conventional electrically based sensors. First, because the photonic sensors have a significantly smaller physical mass and thermal mass than conventional sensors, they can provide an enhanced ability to sense process changes (e.g., strain, temperature, and vibration). This speed of sensing allows those processes to be adjusted as needed. Photonic sensors are also highly resistant to electromagnetic interference and to hostile environments that can render typical electrically based sensors inoperable. Photonic sensors also permit the collection of data with spatial resolution and sensitivity that is greatly enhanced over conventional macrosensors, for example, allowing spatial resolution on the order of 10 μm or better, strain resolution on the order of $10^{-5}$, and temporal resolution on order of a nanosecond or better. The output from multiple arrays of sensors can also be multiplexed, as discussed in greater detail below. Photonic sensors can also be embedded into metals to improve sensor survivability and reliability in manufacturing environments. Metal embedded photonic sensors can be fabricated with a batch fabrication process, and subsequently transferred into larger metallic structures in manufacturing environments. Minimally invasive physical protection (e.g., thermal, photonic, and/or mechanical protection) can be added to the embedded photonic sensors to improve their functionality. The sensors can further be characterized after embedding, and calibrated under dynamic thermal and mechanical loads.

One suitable kind of photonic sensor is based on resonators in nanophotonic crystals. Nanophotonic crystals are periodic lattices of one or more alternating dielectric materials that permit photonic band gaps. These structures are analogous to the atomic potential lattices leading to electronic band gaps in semiconductors. "Defects" in the periodicity of nanophotonic crystals provide an exceptional means to design nanoscale optical resonators from first principles. More specifically, an optical resonator arising from these defects in periodicity resonates at an optical frequency that is highly sensitive to the resonator's thermo-mechanical environment. Thus, monitoring the resonant optical frequency of the optical resonator provides information about that environment that can be used to modify that environment appropriately, e.g., by changing a process parameter.

FIG. 1(a) is a scanning electron micrograph of a nanocavity 120 within a nanophotonic crystal 100, in accordance with some embodiments. The nanocavity can be used as a sensor for thermally and/or mechanically induced strain. The dashed line around nanocavity 120 indicates the defect region where the periodicity of the nanophotonic crystal is disrupted. This defect region forms a nanoscale optical resonator that has a characteristic operating wavelength $\lambda_o$. Light at an integer multiple of this characteristic wavelength $\lambda_o$ resonates within the cavity, and experiences a relatively low loss. As discussed in greater detail below, the presence of thermally and/or mechanically induced strain modifies the characteristic operating wavelength and the loss of the cavity, and thereby allows this strain to be optically characterized.

The resonator can be characterized by its quality factor Q, which is a measure of its extrinsic and intrinsic optical losses. The resonator Q is defined as $\lambda_0/\delta\lambda$, which is the ratio of the resonator operating wavelength $\lambda_o$ to the resonator full-width half-maximum (FWHM) $\delta\lambda$. At the resonant wavelength, the Q of a nanophotonic resonator is as high as $10^5$, which is two to three orders of magnitude higher than conventional fiber Bragg sensors, which can also be used for temperature and strain sensing in manufacturing environments.

Bragg sensors generally contain Bragg gratings as a sensing element. Application of mechanical strain or a temperature change to these gratings shifts the center wavelength of light reflected from the fiber Bragg gratings, and the wavelength shift provides the necessary information to calculate the change in strain or temperature. However, Bragg sensors are typically significantly larger than photonic sensors, e.g., between about 125 and 250 μm in size, versus less than about 10 μm in size for some embodiments of photonic sensors, and are significantly less sensitive as discussed in greater detail herein.

The optical response time of a nanophotonic resonator, e.g., the amount of time it takes a given amount of light resonating within a nanocavity to decay below a threshold value, provides a measure of the rate at which continuous strain event monitoring can be achieved. However, a change in the temperature of the resonator, or the application of a mechanical force, such as compression of the resonator, can cause a strain that modifies the physical characteristics of the structure. This can change the resonator Q as well as the resonant wavelength of the cavity. Thus, a measurement of the resonator Q can be a measure of localized strain.

In some embodiments, the Q of the resonator, and, thus, a measurement of the thermal and/or mechanical strain experienced by the resonator, can be determined interferometrically. For example, in some embodiments, "signal" light of a first wavelength $\lambda_2$ and "control" light of a second wavelength $\lambda_1$ are transmitted into the crystal 100 via a waveguide 140 adjacent the nanocavity 120. The first wavelength $\lambda_2$ is selected to be sufficiently close to the resonant wavelength of the nanocavity 120 that it couples into the nanocavity 120. The light at the first wavelength $\lambda_2$ interacts with the cavity according to the Q of the cavity, and couples back into the waveguide 140. The light at the second wavelength $\lambda_1$ does not significantly couple into the nanocavity 120, but instead simply transmits along the waveguide 140. The light at the first and second wavelengths $\lambda_2$ and $\lambda_1$ interfere with each other, and the intensity of this interference is related to how much attenuation the first wavelength $\lambda_2$ experienced due to its interaction with the nanocavity 120, and thus is related to the strain within the nanocavity. This interferometric intensity is proportional to 1/Q. An optical detector (not shown) in communication with the waveguide and capable of detecting the change in interferometric intensity between $\lambda_2$ and $\lambda_1$ arising from the strain within nanocavity 120 converts the optical interference signal into an electrical signal. This electrical signal is transmitted to a computer processor (not shown) that uses that information to calculate the strain within nanocavity.

When integrated onto a silicon chip, these nanophotonic crystal resonators, like the microring resonators described below, allow the thermo-mechanical strain experienced by the silicon chip to be monitored with enhanced spatial and temporal resolution. The large resonator Q's allow distinguishable Lorentzian resonance peaks under small strain or thermal loading, permitting improved sensitivities.

Furthermore, due to the 1-dimensional geometry of these nanophotonic crystal resonators, strain directionality can be obtained. For example, FIG. 1(b) shows a nanophotonic crystal sensor 130 with sensing in both the x and y directions (both $\epsilon_x$ and $\epsilon_y$) from the same nanocavity resonator 150 in accordance with some embodiments. Sensor 130 includes waveguide 160 in the x-direction, which transmits "signal" and "control" light at first and second wavelengths, respectively, into nanocavity resonator 150 in the x-direction. As discussed above for the sensor of FIG. 1(a), the "signal" light at the first wavelength couples into nanocavity 150, and then couples back into waveguide 160. The "signal" light interferes with the "control" light at the second wavelength, and the intensity of this interference is related to the strain experienced by the nanocavity 150 in the x-direction. A first detector (not shown) detects the interferometric intensity, and a computer processor in electrical communication with the detector analyzes the resulting signal. Sensor 130 also includes waveguide 170 in the y-direction, which transmits "signal" and "control" light at third and fourth wavelengths, respectively, into nanocavity resonator 150 in the y-direction. The "signal" light at the third wavelength couples into nanocavity 150, and then couples back into waveguide 170. The "signal" light interferes with the "control" light at the fourth wavelength, and the intensity of this interference is related to the strain experienced by the nanocavity in the y-direction. A second detector (not shown) detects the interferometric intensity, and the computer processor, which is also in electrical communication with the second detector, analyses the resulting signal. The signals in the x- and y-directions are effectively independent of each other, allowing the separate measurements of the nanocavity's strain in the x- and y-directions with minimal cross-talk.

Figure 2:
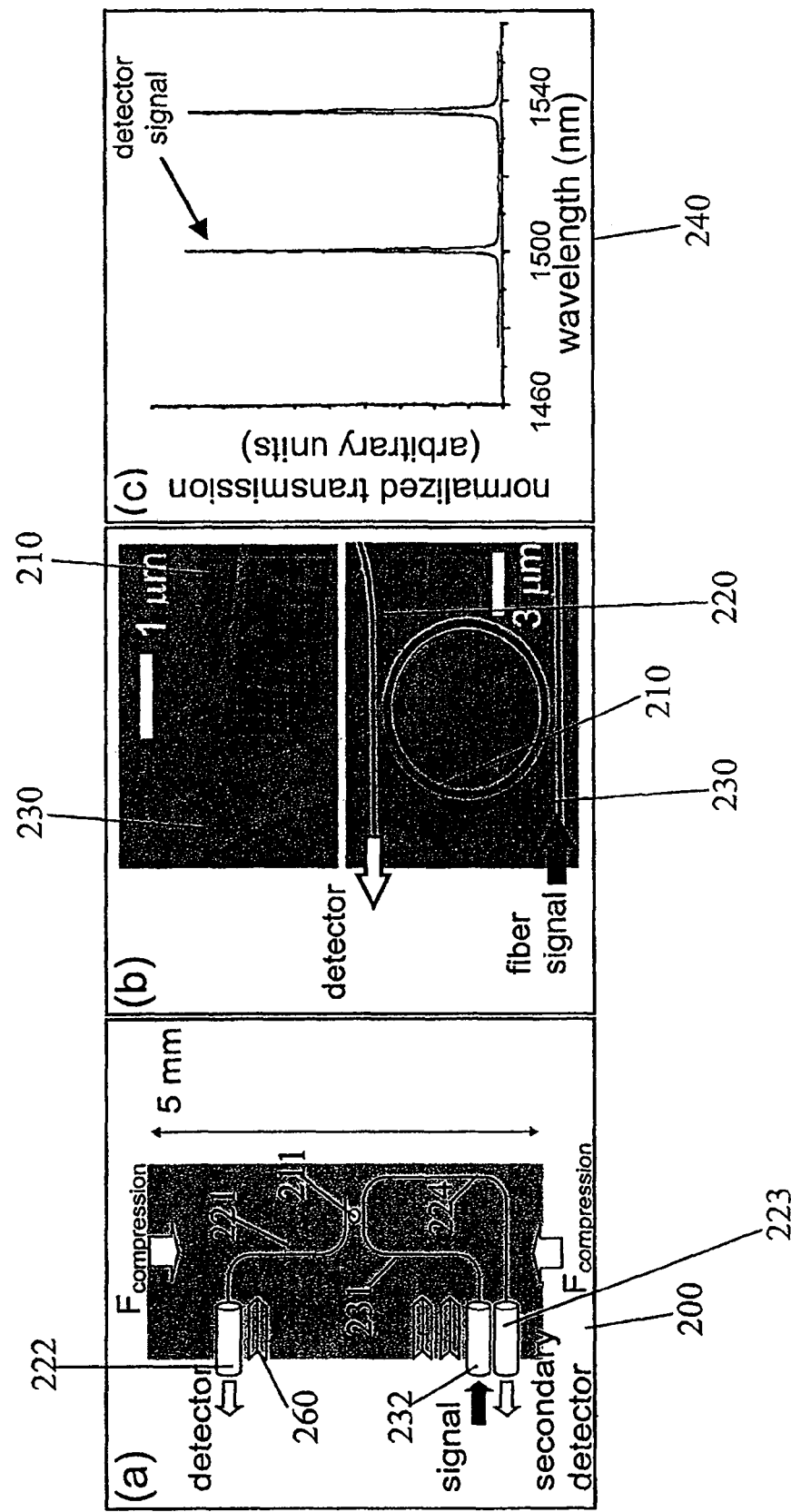
FIG. 2(a) is a schematic of an on-chip sensor system according to some embodiments of the disclosed subject matter.
FIG. 2(b) shows micrographs of perspective and plan views of a microring resonator according to some embodiments of the disclosed subject matter.
FIG. 2(c) is a plot of the normalized transmission peak of the microring resonator of FIG. 2(b) according to some embodiments of the disclosed subject matter.

Another suitable kind of photonic sensor is based on microring resonators. Microring resonators are traveling wave resonators with a transmission response that follows a Lorentzian line shape filter. FIG. 2(b) shows micrographs of a perspective view (top image) and plan view (bottom image) of a fabricated microring resonator 210 in accordance with some embodiments. Signal light from an optical source (not shown), e.g., a fiber optic source, travels along an input waveguide 230 that is positioned adjacent to the microring resonator 210. The microring resonator 210 becomes a resonant sink for the signal light when an integral number of wavelengths match its optical circumference, i.e., at a resonant frequency of the resonator. Light that couples from the input waveguide into the resonator then couples from the microring resonator 210 into an output waveguide 220. This coupled light then travels along the waveguide to an optical detector (not shown), e.g., a photodiode with fiber optic input. The electronic detector output is optionally fed to a lock-in amplifier to reduce noise, and is then input to a computer processor for analysis. FIG. 2(c) is a plot 240 of the normalized transmission peak of the microring resonator of FIG. 2(b), as monitored at a detector in accordance with some embodiments. Plot 240 shows two resonance frequency peaks of the microring resonator, and the distance between the peaks corresponds to the free spectral range of the resonator. As discussed in greater detail below, the central wavelength and bandwidth of the transmission peak are related to the strain the microring resonator experiences due to thermo-mechanical phenomena.

FIG. 2(a) is a schematic of an on-chip fabricated sensor system 200 in accordance with some embodiments. System 200 includes a microring resonator 211, an input waveguide 231, an output waveguide 221, a fiber optic detector 222, and a fiber optic source 232. Optionally, a secondary detector 223, in optical communication with microring resonator 211 via third waveguide 224, can be used for additional detection, e.g., for monitoring the complementary transfer function output, as a back-up to the detector fiber. This complementary transfer function output includes signal light that does not couple into the microring resonator, the intensity of which is reduced by the amount of light that does couple into the microring resonator, thus providing a second method of measuring the change in optical intensity due to optical coupling of signal light into the resonator. V-grooves 260 can also be wet-etched anisotropically on the chip, using standard CMOS processes, to facilitate reliable alignment and placement of the fiber optic source 232 and detectors 222, 223 on the chip relative to the appropriate waveguides 231, 221, and 224, respectively.

When a chip, having the embedded sensor system 200, is mechanically or thermally compressed or stretched, changes in the output signals recorded by the detector(s) can be tracked on GHz-frequency (ns time-scale) commercial optical detectors, and monitored continuously and simultaneously at numerous network grids of the manufacturing structure through wavelength-division multiplexing. The on-chip sensors can also be thermally loaded to finely map-out thermal variability and diffusion responses on small length-scales.

The change in the resonant frequency $\Delta\lambda$, of the microring resonator, with respect to applied strain $\epsilon$, is:

$$\frac{\Delta\lambda}{\lambda_o} = n_{\mathit{eff}}\left[1 - \frac{1}{2}\wp(\epsilon)n_{\mathit{eff}}^3\right]\epsilon \qquad (1)$$

where $\lambda_o$ is the resonant frequency, $n_{\mathit{eff}}$ an effective refractive index, and $\wp(\epsilon)$ is the photoelastic coefficient as a function of strain. For strains on the order of 0.1%, the photoelastic correction term $$\frac{1}{2}\wp(\epsilon)n_{\mathit{eff}}^3$$

can be negligible, and the change in resonant frequency $\Delta\lambda$ is a linear function of strain $\epsilon$. The ratio $(\Delta\lambda/\lambda_o)$ is a linear function of temperature variations, and related as: $\Delta\lambda/\lambda_o = n_{\mathit{eff}}(\alpha+\beta)\Delta T/T$, where $\alpha$ is the linear thermal expansion coefficient and $\beta$ the photothermal coefficient expressing dependence of refractive index on temperature.

The ring resonator can be separated from the waveguides by a gap $\delta$, which is designed and fabricated to be approximately equal to the critical coupling distance for the resonator. A gap of 300 nm is illustrated in the inset 310 of FIG. 3(a). The coupling coefficient $\kappa$ (the spatial overlap integral between the resonator and waveguide modes) is exponentially dependent on the coupling gap $\delta$, and at a "critical" coupling distance, the coupling of light between the waveguide and resonator is the largest. The value of the critical coupling distance depends, among other things, upon the resonant frequency of the ring resonator.

The presence of mechanical or thermal strain in the material changes the size of the coupling gap $\delta$, and therefore also changes the value of the coupling coefficient $\kappa$. The resonator Q is related to $\kappa$ by $$Q = \frac{2\pi^2 R n_e}{\lambda_o \kappa^2},$$

where R is the physical radius of the microring. Thus, a change in the gap size $\delta$ (and therefore the value of $\kappa$) leads to a large shift in the resonator Q. This change in Q can be measured as a change in the light recorded by the optical detector(s), and from that change the strain can be determined. This provides a method for high-resolution strain sensitivity in response to applied strain or thermal loading, with a resolution proportional to 1/Q.

As compared to conventional fiber Bragg grating sensors, microring resonators are significantly smaller in size (e.g., between about 1-10 μm for some embodiments of microring resonators versus between about 125-250 μm for Bragg grating sensors) and permit spatial resolution of at least two orders of magnitude better. In addition, in some embodiments, the quality factor Q of a microring resonator, typically approximately $10^3$ to $10^4$, can be, e.g., a few times better, or even ten times or more better, than conventional fiber Bragg grating sensors, thus improving strain resolution. Microring resonators, like nanophotonic crystal resonators, have temporal resolution on order 25-100 ps. Current detector technology permits measurement of modulation rates up to $10^{11}$ Hz, and thus the temporal resolution measurable by the system is limited mainly by the photon lifetime in the resonator.

This permits significantly improved temporal sensing and detection of high-frequency small-amplitude strain variation, which is supported even with commercial off-the-shelf photodetectors.

Figure 3:
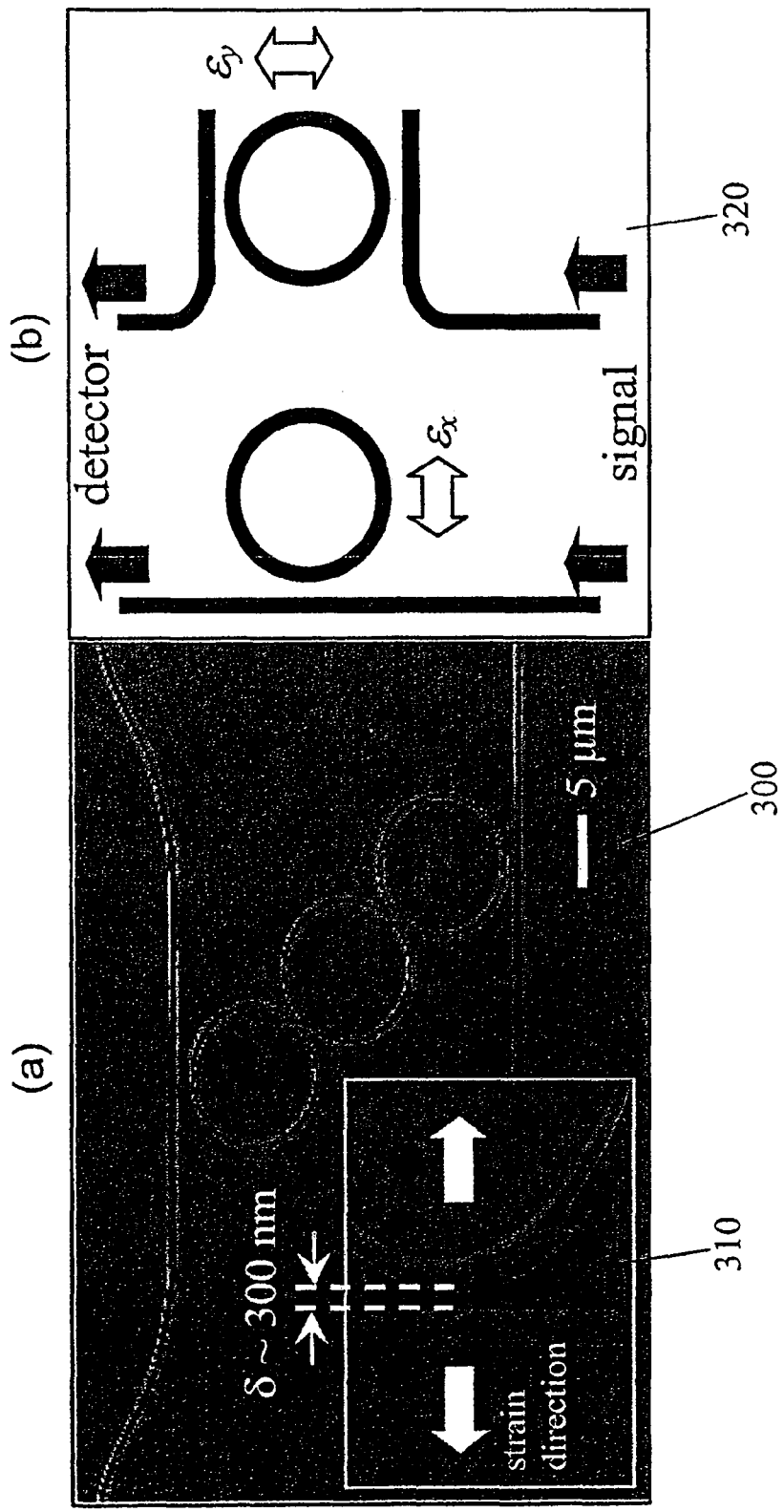
FIG. 3(a) shows micrographs of microring resonators according to some embodiments of the disclosed subject matter.
FIG. 3(b) is a schematic of a microring resonator according to some embodiments of the disclosed subject matter.

As compared to the 1-dimensional nanophotonic crystal resonators shown in FIG. 1(a), microring resonators are inherently 2-dimensional structures. Hence strain measurements from a single microring resonator will yield the aggregate in-plane strain at its position. To achieve strain directionality measurements, a differential structure 320 with microrings in approximately orthogonal directions, as illustrated in FIG. 3(b), can be employed. Although in some embodiments microring resonators sense with slightly lower spatial resolution and slightly lower strain sensitivity than nanophotonic crystal resonators, the optical coupling losses to microring resonators can be lower than for nanophotonic crystal resonators, allowing for potentially easier characterization and measurement. In some embodiments, ring resonators can have a Q between about 2,000 and about 20,000. In some embodiments, nanophotonic crystal resonators have a Q of about 70,000. In general, photonic resonators can have a Q between about 100 and about $10^5$.

Higher order resonator structures, such as structures 300 that shown in FIG. 3(a), can be used to help to improve the sensitivity of the sensor. Larger microrings, with larger radii, can be used to obtain larger Q resonances for higher sensitivity.

In some embodiments, photonic sensors, e.g., nanophotonic crystal and/or microring resonators, are integrated into a short closed-loop optical waveguide (e.g., having a perimeter of approximately 50 mm~100 mm) with an input-output coupling structure.

Note that using optical fiber input and output coupling to the resonators provides data transmission at the speed of light between the individual sensors and the data collection endpoints in the sensor network. This provides distributed sensors with sufficiently high speeds for demanding applications, for example, determining information about critical locations of an aerospace structure, or about the high-speed dynamics of fracture or ballistic impact. Since the photonic sensors are fabricated on-chip, computational and decision logic transistors for deployment of protective systems or corrective actions, for example, can be integrated on-chip for minimal time-delay.

Figure 4:
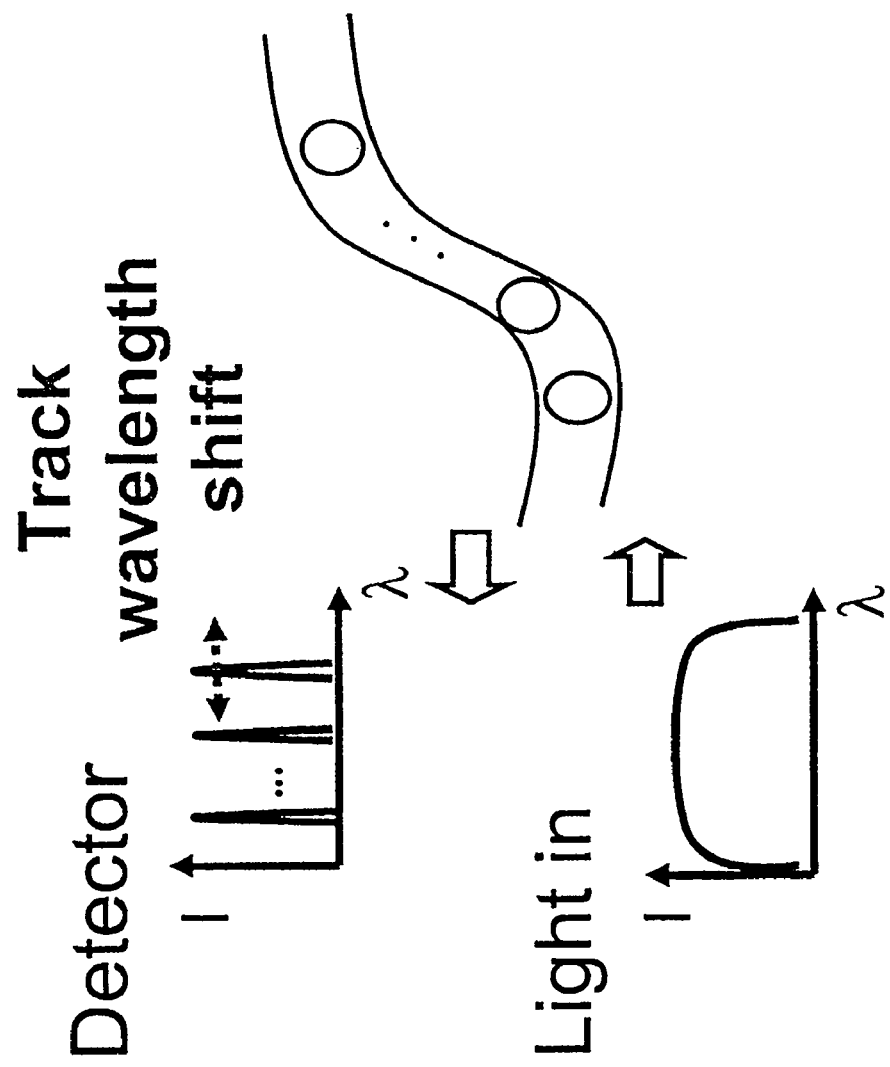
FIG. 4 is a schematic of a collection of information from photonic sensor arrays according to some embodiments of the disclosed subject matter.

Photonic sensors can be defined through standard semiconductor lithography techniques, permitting low-cost batch fabrication as well as high precision location of the sensors on-chip. This provides for the development of an on-chip parallel sensor array. As described above, signal light can be introduced to the sensors via an optical fiber attached to the chip, and a detector can collect light returning from the sensors via a second optical fiber attached to the chip. As shown in FIG. 4, information from multiple arrays of the photonic sensors can be collected over the same fiber bus through wavelength multiplexing. Specifically, in some embodiments a single global light source can be input to an array of microring resonators via an integrated waveguide (curve below resonators), a part of which is adjacent the resonators in the array. As the light traverses the waveguide, it couples to each resonator in the array as it passes, providing an input to the resonator. Similarly, as each resonator produces an output, that output couples to an integrated waveguide (curve above resonators), a part of which is adjacent the resonators in the array, and which feeds the output to a single detector. The output relates to the responses of the different resonators in the array. Commercial off-the-shelf photodetectors can have nanosecond or better response times, supporting significantly improved temporal sensing and detection of multiple high-frequency small-amplitude signals from the resonators in the array.

The photonic resonators can be designed using a variety of analytic and numerical techniques, including finite difference method (FDM) mode solvers, finite difference time domain (FDTD) calculations, and coupled-mode theory. With high index contrast waveguides, these resonators can be made very small since radiation losses from tight bends are greatly reduced. These photonic crystal and microring resonators can be side-coupled or vertically coupled to the input and output waveguides through evanescent fields. The resultant combination is a system with a transfer function that has a single-pole response, i.e., that has a single central resonance frequency, and narrow bandwidth. The location of the pole, and hence the resonator Q and resonant frequency, is determined by the input-output coupling ratios and the attenuation associated with one optical transit phase within the resonator. These parameters are optimized with analytic and numerical techniques prior to fabrication.

Photonic sensors can be fabricated on-chip with silicon-on-insulator wafer substrates (hence permitting CMOS-level batch processing) and the chips packaged to readily couple to signal (input) and detector single-mode optical fibers. For example, microring resonators can be fabricated in high index contrast silicon nitride and silicon material systems using standard CMOS processes. In one method of making microring resonators, a photoresist, e.g., PMMA, is coated over the silicon material from which the sensor is to be made. Electron-beam lithography is then used to define a pattern in the PMMA. The PMMA is developed and subsequently metalized, with a liftoff step, to leave a patterned metal mask over the silicon material. The assembly is etched through the entire depth of the silicon material, and slightly into the insulator layer of the substrate. Then the metal mask is removed using standard CMOS processes to leave the microring resonator sitting on a "pedestal" of insulator, which can help to optically isolate the sensor.

Recent advances in photonic device fabrication have made it possible to construct very small microring resonators in a variety of materials, including glass, polymers, silicon, silicon nitride ($Si_3NH_4$), silicon oxynitride (SiON), and III-V semiconductors. The choice of material depends upon the particular application. For example, in optical signal processing applications like wavelength conversion and high speed optical switching, materials with high nonlinear coefficients such as AlGaAs/GaAs can be used.

In addition, note that in some embodiments, the photonic resonator sensors, in the planar semiconductor fabrication process described here, can be designed for operation in only one light polarization (either transverse electric or transverse magnetic). Hence, the effect of stochastic polarization clue to mechanical strain on signal input-output optical fibers might affect operation of the designed subwavelength resonators and shift the resonance peak slightly. This polarization dependence, however, can be largely removed using customized commercial polarization maintaining (PM) fibers that adequately maintain the same polarization over lengths of 1 kilometer or more.

In some embodiments, distributed microring and nanophotonic crystal resonator sensors are selectively embedded at sensitive locations within a piece, such as a computer chip or mechanical product, without interfering with normal operation of the structure. This helps to avoid directly exposing the sensor to external manufacturing environments, for example, chemicals, moisture, and contamination. Many structures fabricated in hostile manufacturing environments are metallic. Thus embedding sensors in metal is one method of protecting them while using them in a hostile environment.

Figure 5:
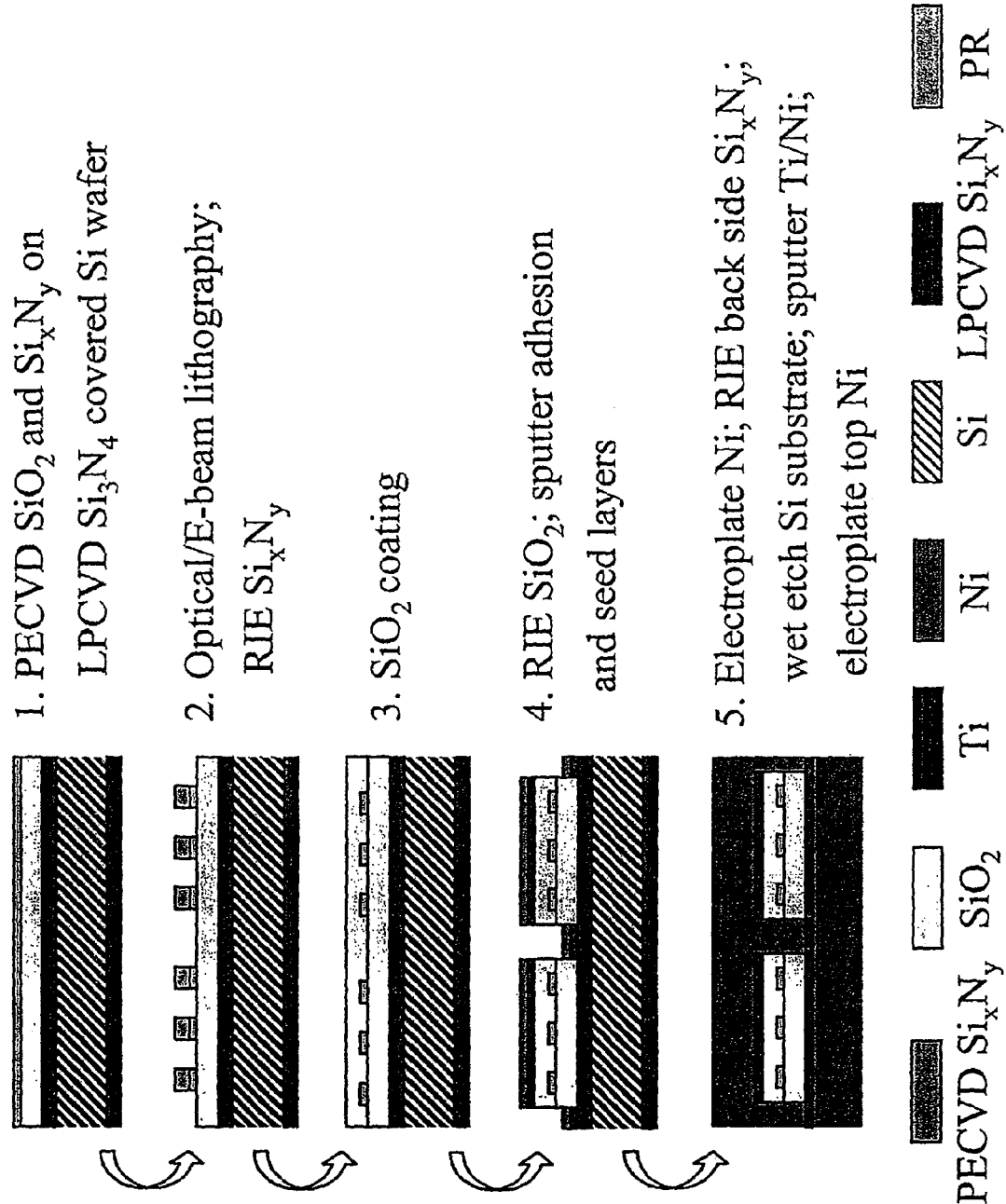
FIG. 5 illustratively shows a method of embedding photonic sensors in a metal according to some embodiments of the disclosed subject matter.

One example of a procedure for fabricating and embedding sensors in a metal in accordance with some embodiments is schematically depicted in FIG. 5. First, at (1), $Si_3N_4$ is deposited using low-pressure chemical vapor deposition (LPCVD) on a Si substrate. As shown in FIG. 5, the $Si_3N_4$ is coated on both sides of the substrate. The $Si_3N_4$ facilitates the release of the sensors from the substrate later during the procedure. Plasma enhanced chemical vapor deposition (PECVD) is then used to deposit a first layer $SiO_2$, which acts as an optical insulator for the sensor, and then a layer of $Si_xN_y$, e.g., the waveguide material, over the LPCVD $Si_3N_4$ film. In general, $Si_xN_y$, $SiO_xN_y$, or another suitable material can be used as the waveguide material, as discussed above and as known in the art. In this example, the sensors are photonic devices made with the PECVD $Si_xN_y$ film, and have an optically insulating structure formed of $SiO_2$. In general, any sensor, such as the photonic sensors described herein can be embedded in metals using the described procedure.

Next, at (2), optical/electron-beam lithography and reactive ion etching (RIE) are used to define the photonic sensors within the waveguide material. In some embodiments, this is done by using conventional lithographic patterning of photoresist (PR) as a mask material, and RIE is subsequently performed to etch the waveguide material in accordance with the pattern of the PR mask.

Next, at (3), the PR is stripped after the etching is complete and $SiO_2$ is then deposited using PECVD. This oxide layer, as well as the one deposited at (1), are used to optically insulate the sensors from the metal layers.

Next, at (4), The $SiO_2$ is patterned using optical/electron-beam lithography and RIE as described above, and as is known in the art. Ti and Ni are optionally sputtered over the resulting structure as adhesion layers.

Next, at (5), Ni is electroplated over the structure. The Ni layer is relatively thick, e.g., about 1 µm, and is structurally robust. The LPCVD $Si_3N_4$ at the bottom of the substrate is then dry etched from the back side using RIE. Wet etching of the silicon substrate is then done, followed by an RIE etch of the remaining $Si_3N_4$ layer immediately beneath the sensors. This frees the sensors from the Si substrate, effectively "transferring" them to the Ni, which then acts as a new "substrate." Ti and Ni are then optionally sputtered as adhesion layers over the newly exposed $SiO_2$ surface, which previously was attached to the substrate via the $Si_3N_4$ layer. Ni is then electroplated over the patterned structure, substantially embedding the sensors, plus the dielectric layers, within the metal. The sensors, thus embedded, can then be readily coupled to a piece for which measurements are desired, for example a computer chip or mechanical product. For example, in some embodiments, a material for which measurements are desired is grown on top of the sensor assembly.

Methods and materials other than those described can be used. For example, electroplating can be selected to deposit metals for this application because it works at near room temperature and generates almost no stresses. However, other metal deposition processes can additionally or alternatively be used, for example laser deposition. Other metals, such as stainless steel, can also be used. In many embodiments, the metal is compatible with standard CMOS process steps.

The number of sensors and their spatial distribution determine the width and length of the embedding thin metal layers. Functionally gradient thin film structures can be designed, selected, and fabricated to optimize material properties such as thermal conductivity, thermal stability, diffusion compatibility, strength, and thermal expansion, between optical layers (e.g., $SiO_2$) and metal layers (e.g., electroplated nickel). Appropriately selecting properties between adjacent layers can, among other things, discourage delamination of the layers and improve the performance of the device. With proper choice of components and individual layer thicknesses, the property of a multilayer coating can be tailored over the average of the two components. The properties of different materials are well studied and documented. However, the growth conditions of the materials (such as temperature, pressure, and deposition rate) can also influence the properties of the as-grown materials. As is known in the art, modest experimentation can be performed in order to obtain "recipes" for growing materials that are suitable for the particular application.

Figure 6:
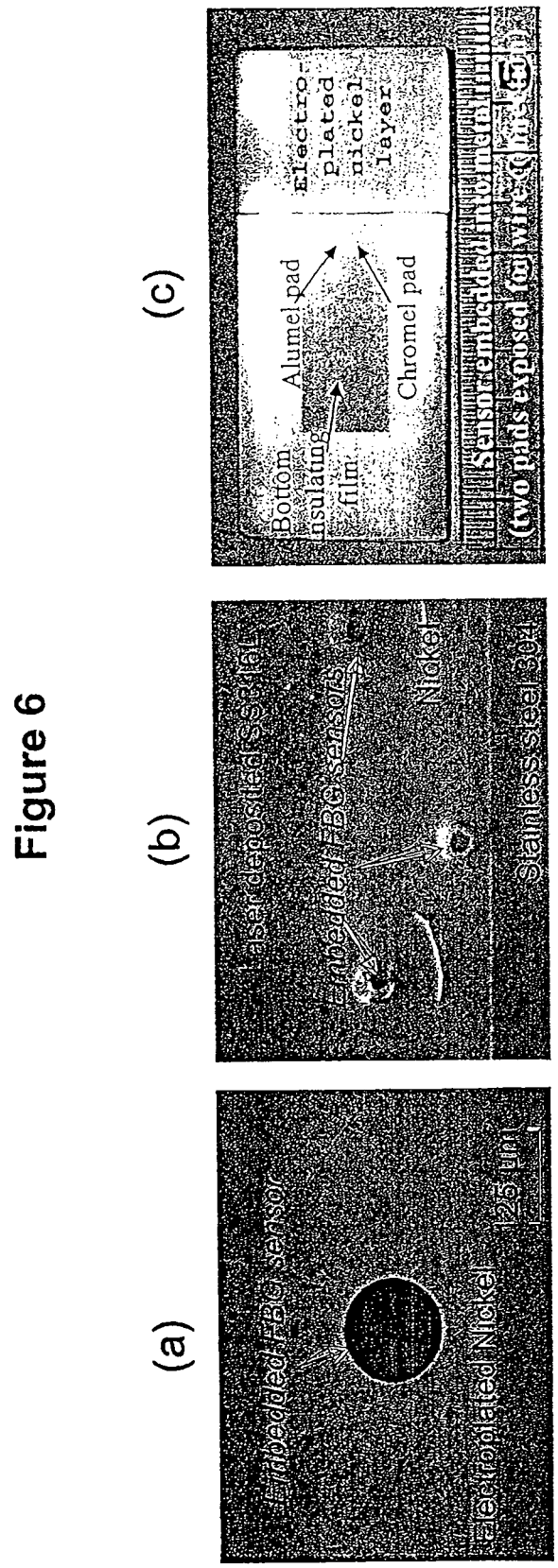
FIGS. 6(a) and 6(b) are micrographs of optical sensors embedded in metals according to some embodiments of the disclosed subject matter.
FIG. 6(c) is a micrograph of a thermocouple embedded in metal according to some embodiments of the disclosed subject matter.

Optical sensors, such as $SiO_2$-based Fiber Bragg Grating (FBG) sensors, can be successfully embedded into metals, e.g. nickel and/or stainless steel for temperature and strain measurements in manufacturing processes, as shown in FIGS. 6(a) and 6(b). Single thin film thermocouples (e.g., type K: alumel-chromel) can also be embedded into metal, as shown in FIG. 6(c). The embedded sensor can be annealed at 800° C. for 3 hrs in argon. X-ray Photo-electron Spectroscopy (XPS) before and after annealing can be used to show that the integrity of the dielectric thin film $Al_2O_3$ and $Si_3N_4$ layers are well preserved, indicating that photonic sensors fabricated from these materials and embedded in metal will also survive. The sensor pads on the thermocouples can be soldered with fine electrical wires, which can then be connected to a PC-based data acquisition system for calibration in a temperature-controlled oven.

Sub-micron optical thin films demonstrate improved properties over their macro-optic counterparts. For example, amorphous submicron/nano $SiO_2$ and $Si_3N_4$ thin films have significantly higher strain limit (3~10%) than that of most metals (0.2~1%). In some embodiments, the core regions of the optical waveguides can be further optically isolated from the metal surfaces in which they are embedded in order to avoid unacceptably large optical losses due to optical absorption by the metal. This isolation can be achieved by using a cladding layer (for example, $SiO_2$) of adequate thickness so that the evanescent waveguide field will be sufficiently weak at the cladding-metal interface. Standard analytic tools from integrated optics can be used to compute the appropriate cladding thickness. Single-mode waveguides cladded on both sides with a 2.0 µm silicon oxide show negligible loss into the substrate.

FIG. 7 shows images of the transfer of a batch of photonic sensors directly from a silicon wafer onto an electroplated nickel layer, and the embedding of the sensors in metal. The process steps described above in connection with FIG. 5 can be applied to a wafer having thin films patterned across its surface using the batch fabrication of metal-embedded photonic sensors in a clean room environment using standard CMOS processes. Other kinds of structures, e.g., optical and electronic devices, can also be embedded in metals using the described, or similar, techniques.

Figure 8:
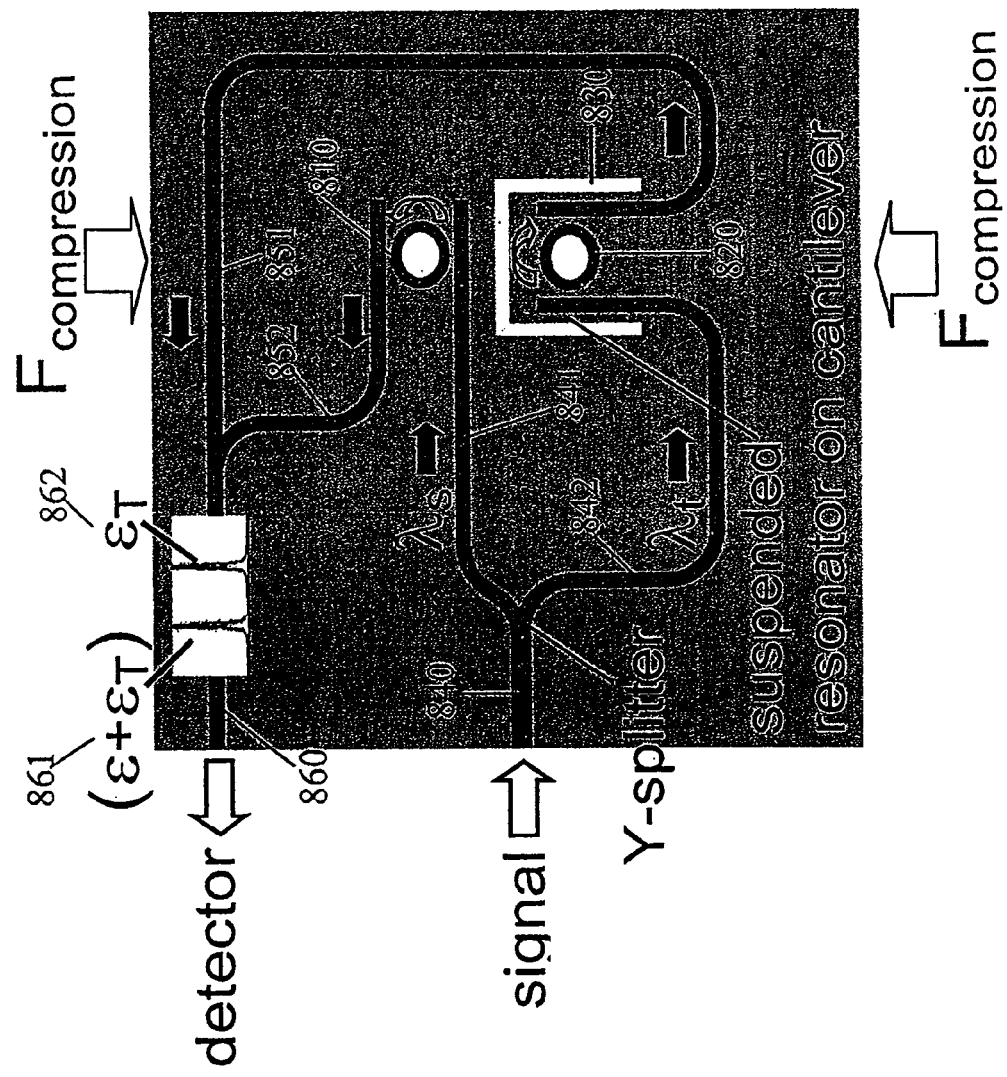
FIG. 8 is a schematic of a system for separating mechanically and thermally induced strain components according to some embodiments of the disclosed subject matter.

As mentioned earlier, the photonic sensors described herein respond to strain caused by both mechanical and thermal effects. FIG. 8 is a schematic of a system for enhancing the sensitivity of microring photonic sensors to mechanically induced strain by providing a thermal reference scheme, in accordance with some embodiments. The system includes: a first microring resonator 810; a second microring resonator 820, which is suspended on a cantilever 830; a signal waveguide 840; and an output waveguide 860. Signal waveguide 840 is split by a "y-splitter" into first and second signal waveguides 841 and 842, which lead to first and second microring resonators 810 and 820, respectively, substantially as discussed above relative to the single microring resonators. Output waveguide 860 is split by a "y-splitter" into first and second output waveguides 851 and 852, which lead from first and second microring resonators 810 and 820, respectively, substantially as discussed above relative to the single microring resonators. The system also includes an optical source (not shown) that is coupled to signal waveguide 840 (and thus to first and second signal waveguides 841 and 842), and a detector (not shown) that is coupled to output waveguide 860 (and thus to first and second output waveguides 851 and 852).

First microring resonator 810 experiences both mechanical and thermal strain effects arising from its environment. However, second microring resonator 820 is suspended on cantilever 830, and thus does not experience significant mechanical strain due to, e.g., compressive forces $F_{compression}$ on the system, although it remains thermally coupled to the system and thus experiences thermal strain effects. In some embodiments, signal light from an approximately single-wavelength optical source is split at the "y-splitter." A portion of the signal light is input to the first microring resonator 810 via first signal waveguide 841, and another portion of the light is input to the second microring resonator 820 via second signal waveguide 842. Because the first and second microring resonators 810 and 820 experience different strain effects, they couple differently to the signal light, e.g., with different coupling efficiencies. The light that couples to each of the microring resonators then couples as output into the corresponding first or second output waveguide 851 or 852. Where the first and second output waveguides join at the "y-splitter," the respective outputs from the first and second microring resonators 810 and 820 interfere with each other, when the optical path lengths (841+810+852) and (842+820+851) are designed and fabricated to be sufficiently similar to permit interference between the output signals. The thermal signal 862 from the second resonator 820 destructively interferes with the thermal component of the overall (thermal plus mechanical) signal 861 from the first resonator 810, such that the main remaining signal component is the mechanical signal as measured by the first resonator. Some embodiments include a subsystem for adjusting the relative optical phases of the output signals from the two resonators in order to enhance their destructive interference, optionally under control of the computer processor. Note that in the illustrated embodiment, the direction of strain is orthogonal to the direction of light propagating through the system, although other configurations can be used.

In other embodiments, the first and second microring resonators 810 and 820 are designed and fabricated so as to have slightly different resonant wavelengths, and the signal light includes first and second wavelengths that are at or near the resonant wavelengths of the respective resonators. After the signal light couples to the resonators, the resulting output signals are joined together by the "y-splitter" and sent to the detector, where the thermal signal as measured by the second microring resonator 820 are normalized away, or otherwise subtracted from, the overall signal (thermal plus mechanical) as measured by the first microring resonator 810.

In general, different embodiments of photonic sensors, e.g., the nanophotonic crystal and microring resonators described herein, or other types of sensors, can be implemented in this scheme, and other interferometric or other kinds of input/output arrangements are possible.

In summary, photonic sensors, such as nanophotonic crystal and microring resonators, can be individually designed for a particular application, and can have strain sensitivities on the order of $10^{-5}$. The strain sensitivity is inversely proportional to Q, and hence the sensors are designed to have as large a Q as possible. In some embodiments, photonic resonators are designed to operate in an interference scheme with two coupled resonators, and, thus, have an even higher strain sensitivity, e.g., up to order $10^{-8}$ strain. The photonic sensors can be fabricated using standard CMOS processing, and can be embedded in metals to optimize their performance in hostile manufacturing environments. The photonic sensors can be used to measure in-situ strain and temperature effects on computer chips and mechanical elements as they are being fabricated, and can also be used to measure residual strains in the chips and elements after fabrication is completed. Although nanophotonic crystals and microring resonators of a particular design are described herein, other structures that serve as photonic sensors, and that can optionally be embedded in metals, can also be used in some embodiments.

In view of the wide variety of embodiments to which the principles of the present invention can be applied, it should be understood that the illustrated embodiments are illustrative only, and should not be taken as limiting the scope of the present invention. Features of the present invention can be used in any suitable combinations.

What is claimed is:

1. A method of embedding a photonic sensor in metal, the method comprising:
   depositing at least one first optically insulating layer on a substrate;
   depositing and patterning at least one waveguide material on the first optically insulating layer to define the photonic sensor;
   depositing and patterning at least one second optically insulating layer over the photonic sensor;
   depositing at least one first metal layer over the at least one second optically insulating layer;
   etching the substrate to free the first and second optically insulating layers, the photonic sensor, and the at least one first metal layer from the substrate so as to expose a surface of the at least one first optically insulating layer;
   depositing at least one second metal layer over the exposed surface of the at least one first optically insulating layer so as to substantially embed the photonic sensor and first and second optically insulating layers between the first and second metal layers.

2. The method of claim 1, wherein patterning the waveguide material comprises at least one of lithography and etching.

3. The method of claim 1, wherein the optically insulating layers are formed from $SiO_2$.

4. The method of claim 1, wherein the optically insulating layers are deposited by plasma enhanced vapor deposition.

5. The method of claim 1, wherein the at least one waveguide material is $Si_xN_y$.

6. The method of claim 1, wherein the at least one waveguide material is $SiO_xN_y$.

7. The method of claim 1, wherein the at least one waveguide material is deposited by plasma enhanced vapor deposition.

8. The method of claim 1, wherein the first and second metal layers are formed from Ni or Ti, or combinations thereof.

9. The method of claim 1, wherein the first and second metal layers are deposited by electroplating.

10. The method of claim 1, wherein the photonic sensor is configured for operation only in a transverse electric polarization.

11. The method of claim 1, wherein the photonic sensor is configured for operation only in a transverse magnetic polarization.

12. The method of claim 1, further comprising embedding at least one photonic sensor at select locations within a computer chip or mechanical product.

13. The method of claim 12, further comprising annealing the embedded photonic sensor.

14. The method of claim 1, wherein the photonic sensor is configured to measure strain.

15. The method of claim 1, wherein the photonic sensor is configured to measure temperature.

16. The method of claim 1, wherein a plurality of photonic sensors are manufactured in a batch process.

17. The method of claim 1, wherein the first and second metal layers are deposited by laser deposition.

18. The method of claim 1, wherein the photonic sensor is a photonic crystal resonator.

\* \* \* \* \*